(12) United States Patent
Bhageria et al.

(10) Patent No.: US 8,892,267 B2
(45) Date of Patent: Nov. 18, 2014

(54) REAL-TIME MONITORING, CONTROLLING, AND OPTIMIZING ELECTRICAL GENERATION ASSETS BASED ON EMISSION LEVEL MEASUREMENTS

(75) Inventors: Gopal K. Bhageria, Overland Park, KS (US); Sri Ramanathan, Lutz, FL (US); Jean-Gael F. Reboul, Kenmore, WA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 13/418,657

(22) Filed: Mar. 13, 2012

(65) Prior Publication Data

US 2013/0245843 A1 Sep. 19, 2013

(51) Int. Cl.
*G06F 19/00* (2011.01)
(52) U.S. Cl.
USPC .................................. 700/291; 700/297
(58) Field of Classification Search
None
See application file for complete search history.

(56) References Cited

U.S. PATENT DOCUMENTS

| | | | |
|---|---|---|---|
| 5,970,426 A * | 10/1999 | Mandel et al. | 702/32 |
| 2005/0188745 A1* | 9/2005 | Staphanos et al. | 73/23.31 |
| 2008/0021675 A1* | 1/2008 | Fehr et al. | 702/182 |
| 2008/0243657 A1 | 10/2008 | Voysey | |
| 2008/0306801 A1 | 12/2008 | Musier et al. | |
| 2009/0018884 A1 | 1/2009 | McConnell et al. | |
| 2009/0088991 A1 | 4/2009 | Brzezowski et al. | |
| 2009/0228584 A1 | 9/2009 | Maes et al. | |
| 2009/0287520 A1 | 11/2009 | Zimmerman | |
| 2010/0187030 A1 | 7/2010 | Gearhart | |
| 2010/0214090 A1* | 8/2010 | Sartini et al. | 340/517 |
| 2010/0283606 A1 | 11/2010 | Tsypin et al. | |
| 2010/0324748 A1 | 12/2010 | Voysey | |
| 2011/0251966 A1* | 10/2011 | Akers et al. | 705/308 |
| 2013/0154822 A1* | 6/2013 | Kumar et al. | 340/501 |

* cited by examiner

*Primary Examiner* — Ryan Jarrett
(74) *Attorney, Agent, or Firm* — Matthew Chung; Roberts Mlotkowshi Safran & Cole, P.C.

(57) ABSTRACT

A method is implemented in a computer infrastructure and includes receiving data defining a detected gas emission level of a power generation facility. The method also includes communicating the data defining the detected gas emission level to at least one subscriber device using one of Service Oriented Architecture (SOA) based communication and Session Initial Protocol (SIP) based communication.

16 Claims, 7 Drawing Sheets

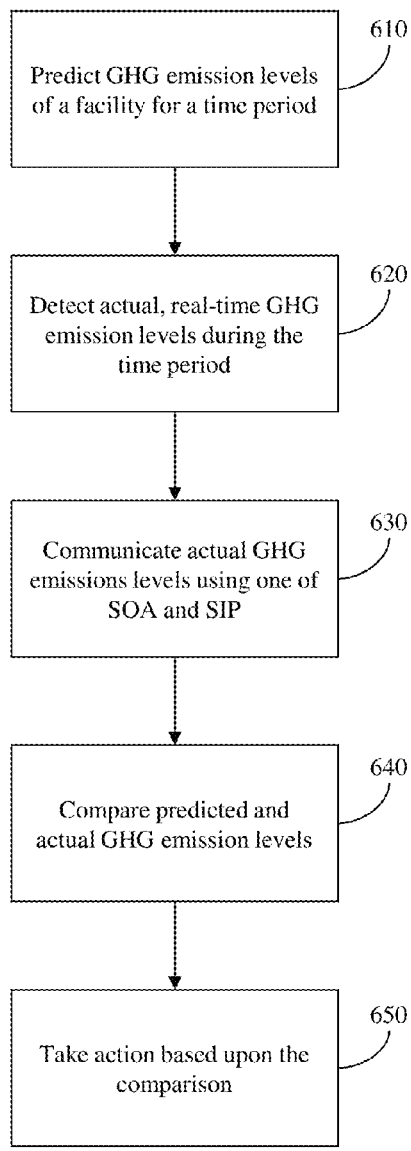
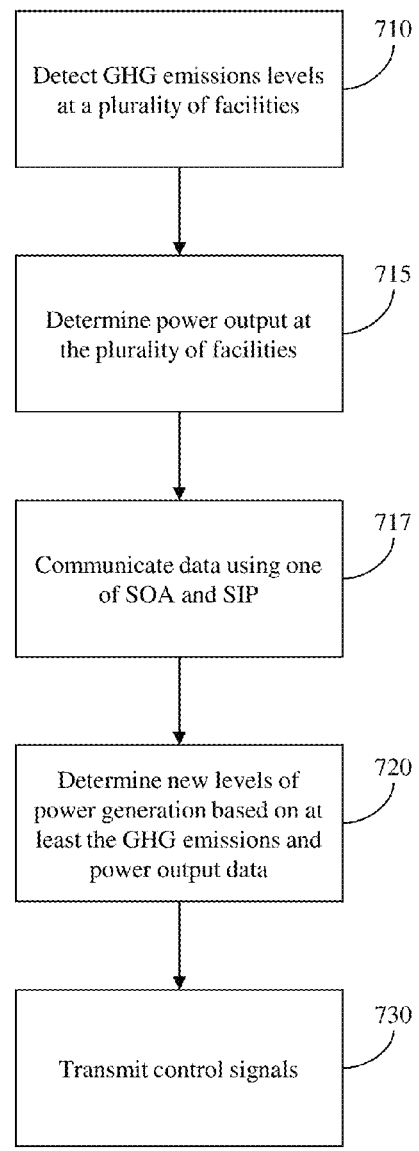
FIG. 6
FIG. 7

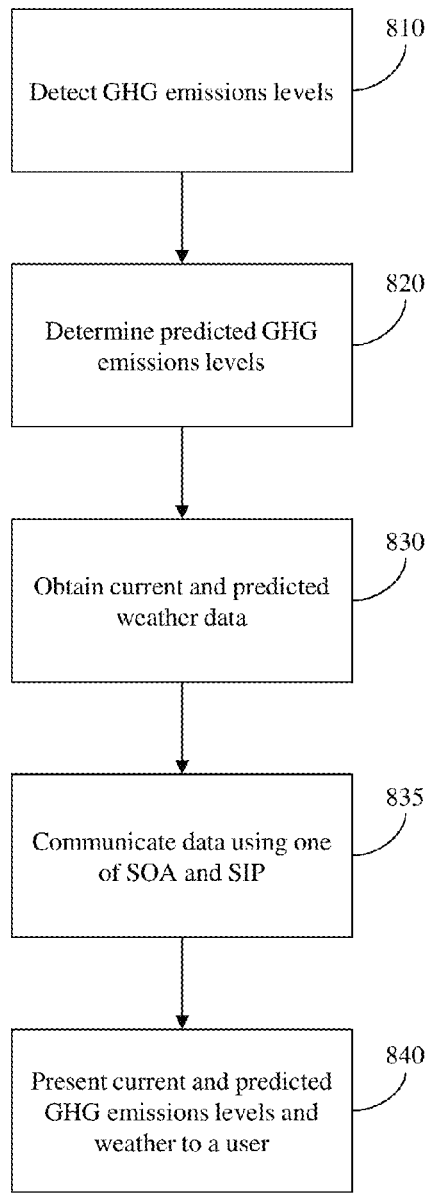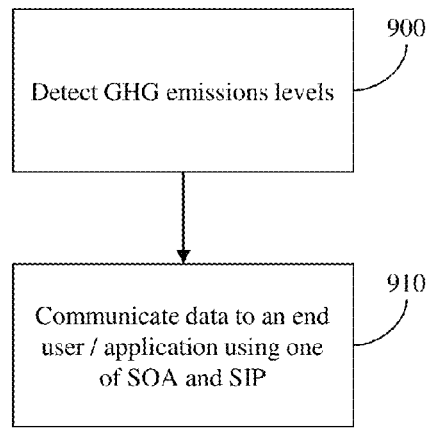
FIG. 9
FIG. 8

REAL-TIME MONITORING, CONTROLLING, AND OPTIMIZING ELECTRICAL GENERATION ASSETS BASED ON EMISSION LEVEL MEASUREMENTS

TECHNICAL FIELD

The present invention relates generally to real-time monitoring, controlling, and optimizing electrical generation assets based on real-time greenhouse gas emission level measurements and, more particularly, to methods and system for performing the real-time monitoring, controlling, and optimizing using Service Oriented Architecture (SOA) design pattern and Session Initial Protocol (SIP) based architecture.

BACKGROUND

Power generation may be controlled and settled through wholesale market operations driven by pricing and generation control systems driven to meet the demand requirements and economic dispatch. Even though power generation providers are sometimes required to meet certain environmental mandates, such as respecting a yearly quota of greenhouse gas emission level, these environmental criteria are yet to be considered when it comes to controlling and optimizing the power generation of a particular geographical area.

Moving forward, with the expected increased demand of electricity and the growing concerns regarding the environment and the effects of greenhouse gases on the global warming for instance, the wholesale market rules will gradually introduce constraints on the power generation utilities to favor the environmental friendly generating units. This will require changes to the market clearing engine of a market system, as changes to generation control applications located at the generation management system (GMS) to consider additional inputs.

SUMMARY

In a first aspect of the invention, a method is implemented in a computer infrastructure and includes receiving data defining a detected gas emission level of a power generation facility. The method also includes communicating the data defining the detected gas emission level to at least one subscriber device using one of Service Oriented Architecture (SOA) based communication and Session Initial Protocol (SIP) based communication.

In another aspect of the invention, a system is implemented in hardware which includes a processor executing a manager that operates to: receive a subscription from at least one subscriber device; receive data from a sensor at a power generation facility, wherein the data defines a detected gas emission level of the power generation facility; and communicate the data defining the detected gas emission level to the at least one subscriber device using one of Service Oriented Architecture (SOA) based communication and Session Initial Protocol (SIP) based communication.

In an additional aspect of the invention, a computer program product includes a computer usable storage medium having readable program code embodied in the storage medium. The computer program product includes at least one component operable to: receive a subscription from at least one subscriber device; receive data from a sensor at a power generation facility, wherein the data defines a detected emission level of the power generation facility; and communicate the data defining the detected emission level to the at least one subscriber device using one of Service Oriented Architecture (SOA) based communication and Session Initial Protocol (SIP) based communication.

In another aspect of the invention, there is a computer system for reporting greenhouse gas emissions. The system includes a CPU, a computer readable memory, and a computer readable storage media. The system also includes first program instructions to receive a subscription from at least one subscriber device. The system includes second program instructions to receive data from a sensor at a power generation facility, wherein the data defines a detected gas emission level of the power generation facility. The system includes third program instructions to communicate the data defining the detected gas emission level to the at least one subscriber device using one of Service Oriented Architecture (SOA) based communication and Session Initial Protocol (SIP) based communication. The system also includes fourth program instructions to receive a control signal from the at least one subscriber device based on the at least one subscriber device processing the data defining the detected gas emission level. The system also includes fifth program instructions to adjust an amount of power generation of the power generation facility based on the control signal. The first, second, third, fourth, and fifth program instructions are stored on the computer readable storage media for execution by the CPU via the computer readable memory.

In a further aspect of the invention, there is a method of deploying a system for reporting greenhouse gas emissions. The method includes providing a computer infrastructure operable to: receive a subscription from at least one subscriber device; receive data from a sensor at a power generation facility, wherein the data defines a detected gas emission level of the power generation facility; and communicate the data defining the detected gas emission level to the at least one subscriber device using one of Service Oriented Architecture (SOA) based communication and Session Initial Protocol (SIP) based communication.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 4-9 show flow and/or block diagrams for implementing steps in accordance with aspects of the invention.

DETAILED DESCRIPTION

Figure 1:
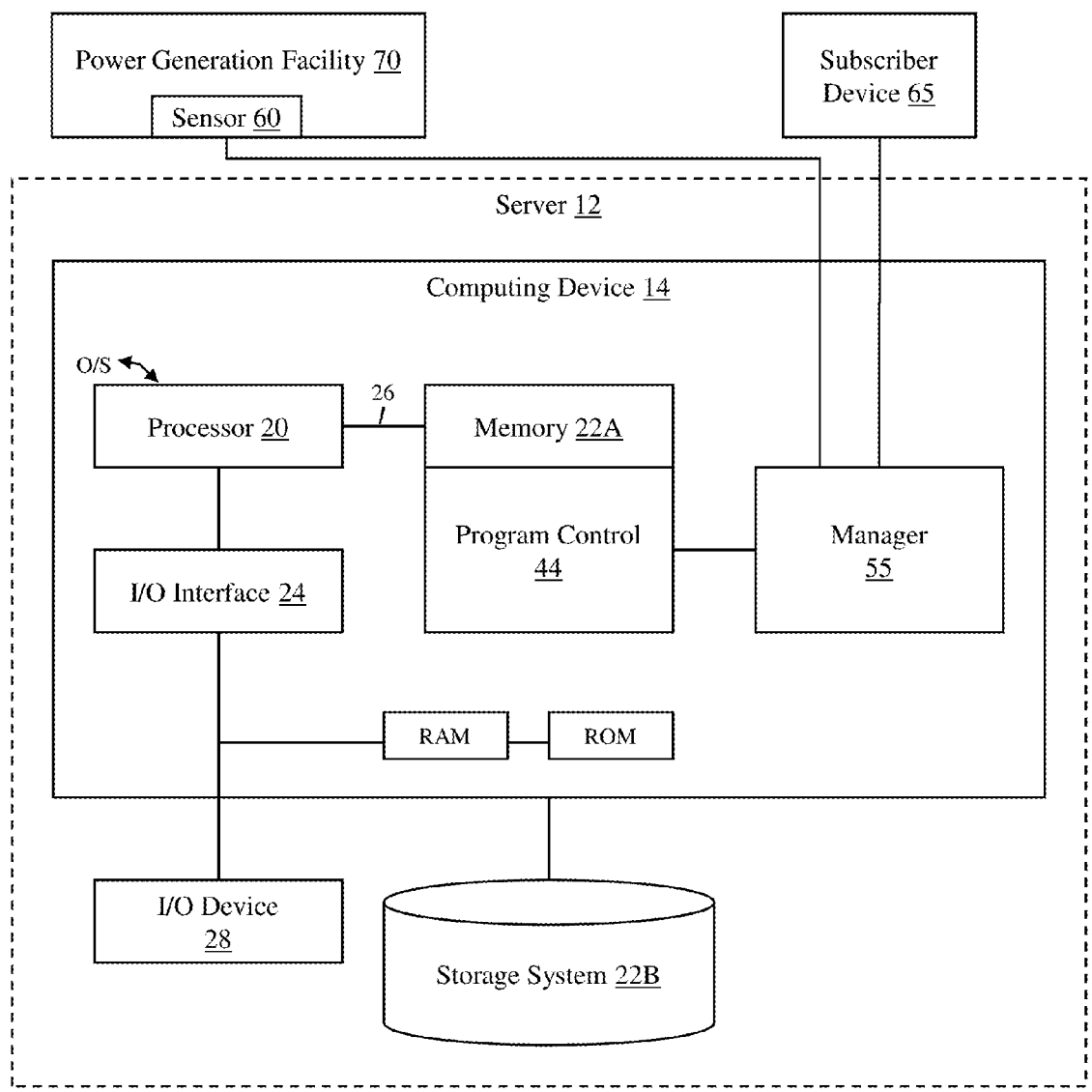
FIG. 1 shows an illustrative environment of a server and/or a computing device for implementing steps in accordance with aspects of the invention.

The present invention relates generally to real-time monitoring, controlling, and optimizing electrical generation assets based on real-time greenhouse gas emission level measurements and, more particularly, to methods and system for performing the real-time monitoring, controlling, and optimizing using Service Oriented Architecture (SOA) design pattern and Session Initial Protocol (SIP) based architecture. In accordance with aspects of the invention, gas emissions are measured in real time at power generation facilities, and the measurements are communicated to various subscribers via SOA or SIP based communication. Implementations of the invention provide the ability to efficiently monitor, control, and/or optimizing the power generation and/or power consumption based on the emissions measured in real time.

Although implementations of the invention are described with respect to greenhouse gas (GHG) emissions produced during electrical power generation, the invention is not limited to these examples, and implementations of the invention may be used with any type of gas emissions produced during any desired process. As described herein, greenhouse gas emissions real-time measurements include but are not limited to the following gases: carbon dioxide, methane, nitrous oxide, and gas containing fluorine (the F-gases HFCs, PFCs and SF6), tri-chloro-fluoro-methane (cfc-11), di-chloro-fluoro-methane (cfc-12), 1,1,2-Trichloro-1,2,2-trifluoroethane (cfc-113), carbon tetrachloride, and hydro-chloro-fluoro-carbons (HCFCs).

As described herein, a subscriber may be any device, system, and/or application that receives and uses the greenhouse gas emissions real-time measurements in some capacity. For example, in embodiments, the greenhouse gas emissions real-time measurements are used within subscribers comprising generation applications, such as unit commitment, economic dispatch, automatic generation monitoring and control, etc. In additional embodiments, the measurements may also be leveraged by advanced visualization capabilities to provide control center operators with an increased situational awareness of the environmental factors of generation, e.g., in a manner similar to informing the plant and grid operators of the current weather, which can impact the reliability of generation, transmission, and distribution of electricity. Other subscribers may include, for example: field plant mobile devices; plant management systems; other plant applications; client (e.g., consumer) mobile applications and devices; regulatory organizations; market systems; energy and generation management systems; utility customer portals; energy and greenhouse gas management user interfaces; and/or other applications.

Implementations of the invention may be used to: extend the existing capabilities of sensing greenhouse gas emissions to potentially reduce the impacts on the environment of generating electricity; enable enhanced real-time control and management of power generation to meet the environmental mandates associated with energy production; increase the situational awareness on greenhouse gas emissions of plant and grid operators and energy consumers in general; promote a communication standard to enable power plants to provide greenhouse gas emissions real-time measurement data to different types of monitoring systems; and/or support large amounts of telemetered measurements and controllable assets through the use of well-proven, high-performing and low latency communication protocols, to name but a few uses.

In embodiments, the greenhouse gas emissions real-time measurements are communicated from the power generation facility to subscribers (e.g., subscriber devices, systems, applications, etc.) using a Service Oriented Architecture (SOA) in which sensor devices publish real-time measurements for applications to subscribe and use in various processes. Such processes may include, but are not limited to, unit commitment, settlement and marketing clearing engines, economic dispatch, generation monitoring and/or control applications, as web-based and mobile applications.

The SOA implementation provides a greenhouse gas emission level web service that provides complete interoperability between the sensors and the various subscriber applications running on disparate platforms. The SOA implementation is based on web services that use open standards and protocols. Protocols and data formats may be text-based, thereby making it easy for developers to comprehend and extend the service to more (e.g., future) sensors and/or end units. Moreover, by utilizing HTTP, HTTPS, JMS, and/or MQ as communication protocols, web services are relatively simple to configure for cyber-security in SOA implementations of the invention. Lastly, web services enable systems from different companies to interact in an integrated and cohesive manner. In this manner, subscribers of greenhouse gas emission level real-time web service need only know the interface and then can subscribe to the messages and notifications they are interested in, after which all subsequent notifications are automatically handled by the web service.

In further embodiments, the greenhouse gas emissions real-time measurements are communicated from the power generation facility to subscribers using Session Initiation Protocol (SIP) as a communication protocol between greenhouse gas emissions sensor devices, a set of presence servers, and a set of watcher systems. Such watcher systems may include, but are not limited to, settlement applications and marketing clearing of wholesale market operations systems, SCADA (supervisory control and data acquisition) systems, generation monitoring and control applications of GMS, advanced visualization tools used by grid operators, utility portals, mobile devices, and/or fiscal systems.

The use of SIP implementations of the invention allows fast and efficient communications using minimal bandwidth. For example, using the SIP implementation, rich XML formatted messages can be readily accommodated in a presence status messages. Moreover, subscribers need only be presence server aware (e.g., clients), and then can subscribe to the messages and notifications they are interested in, after which all subsequent notifications are automatically handled by the system. Lastly, reactions to any notifications can be completely out of band (OOB), which allows for a flexible architecture to respond in a temporally and channel appropriate manner.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be, for example, a handheld device, PDA, handset, keyboard, etc.

In general, the processor 20 executes computer program code (e.g., program control 44), which can be stored in the memory 22A and/or storage system 22B. Moreover, in accordance with aspects of the invention, the program control 44 controls a manager 55 that performs one or more of the processes described herein. In embodiments, the manager 55 communicates with at least one sensor device 60 that measures greenhouse gas emissions of a power generating facility 70 (also referred to as a power generating plant and/or power generating unit). The manager 55 also communicates with at least one subscriber device 65, e.g., a subscriber as described herein. The communication between the manager 55, the sensor device 60, and the subscriber device 65 can be provided via a SOA-based communication in some embodiments, and via SIP-based communication in other embodiments.

As should be understood by those of skill in the art, SIP is a signaling protocol widely used for controlling multimedia communication sessions, such as voice and video calls over Internet Protocol (IP). The SIP protocol can be used for creating, modifying, and terminating two-party (unicast) or multiparty (multicast) sessions consisting of one or several media streams. In embodiments, the present invention implements SIP as video conferencing, streaming multimedia distribution, instant messaging, presence information and/or file transfer applications. In embodiments, SIP can be implemented as a text-based protocol, incorporating many elements of the Hypertext Transfer Protocol (HTTP) and the Simple Mail Transfer Protocol (SMTP). Also, as used in the present invention, SIP is an Application Layer protocol designed to be independent of the underlying transport layer, and as such, can run on Transmission Control Protocol (TCP), User Datagram Protocol (UDP), or Stream Control Transmission Protocol (SCTP).

As should be additionally understood by those of skill in the art, SOA is a network design that uses Uniform Resource Locators (URL) to define and locate services provided to end users. SOA is based on loose coupling of services with operating systems and other technologies that underlie applications, meaning that a service can be implemented on a first platform or language and the application consuming the service can be on a different platform or language. SOA separates functions into distinct units, or services, which developers make accessible over a network in order to allow users to combine and reuse them in the production of applications. These services and their corresponding consumers communicate with each other by passing data in a well-defined, shared format, or by coordinating an activity between two or more services.

Still referring to FIG. 1, the manager 55 can be implemented as one or more program code in the program control 44 stored in memory 22A as separate or combined modules. Additionally, the manager 55 may be implemented as separate dedicated processors or a single or several processors to provide the function of this tool. Moreover, it should be understood by those of ordinary skill in the art that the manager 55 is used as a general descriptive term for providing the features and/or functions of the present invention, and that the manager 55 may comprise many different components such as, for example, components and/or infrastructure described and shown with reference to FIGS. 2-3. For example, in embodiments, the manager 55 may be configured to: receive a subscription from at least one subscriber device; receive data from a sensor at a power generation facility, wherein the data defines a detected gas emission level of the power generation facility; and communicate the data defining the detected gas emission level to the at least one subscriber device using one of Service Oriented Architecture (SOA) based communication and Session Initial Protocol (SIP) based communication.

The sensor device 60 may comprise any suitable device that measures levels of gaseous emissions and, in particular embodiments, comprises a device that measures levels of greenhouse gases in real time. Such sensors are conventional such that further explanation is not believed necessary. In embodiments, one or more sensors 60 are located at an electrical power generation facility 70 for which the greenhouse gas emissions are to be monitored and reported in accordance with aspects of the invention. The sensors 60 may be used at any desired type electrical power generation facility 70, such as a natural gas fired power plant, coal fired power plant, biomass fuelled power plant, etc. Any desired number of sensors 60 may be used at any desired number of facilities in accordance with aspects of the invention. In embodiments, the sensor 60 is capable of, or is operatively connected to a computing device that is capable of, communicating measured greenhouse gas data of the facility 70 to the manger 55 using SOA or SIP based communication.

While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

SOA Environment

Figure 2:
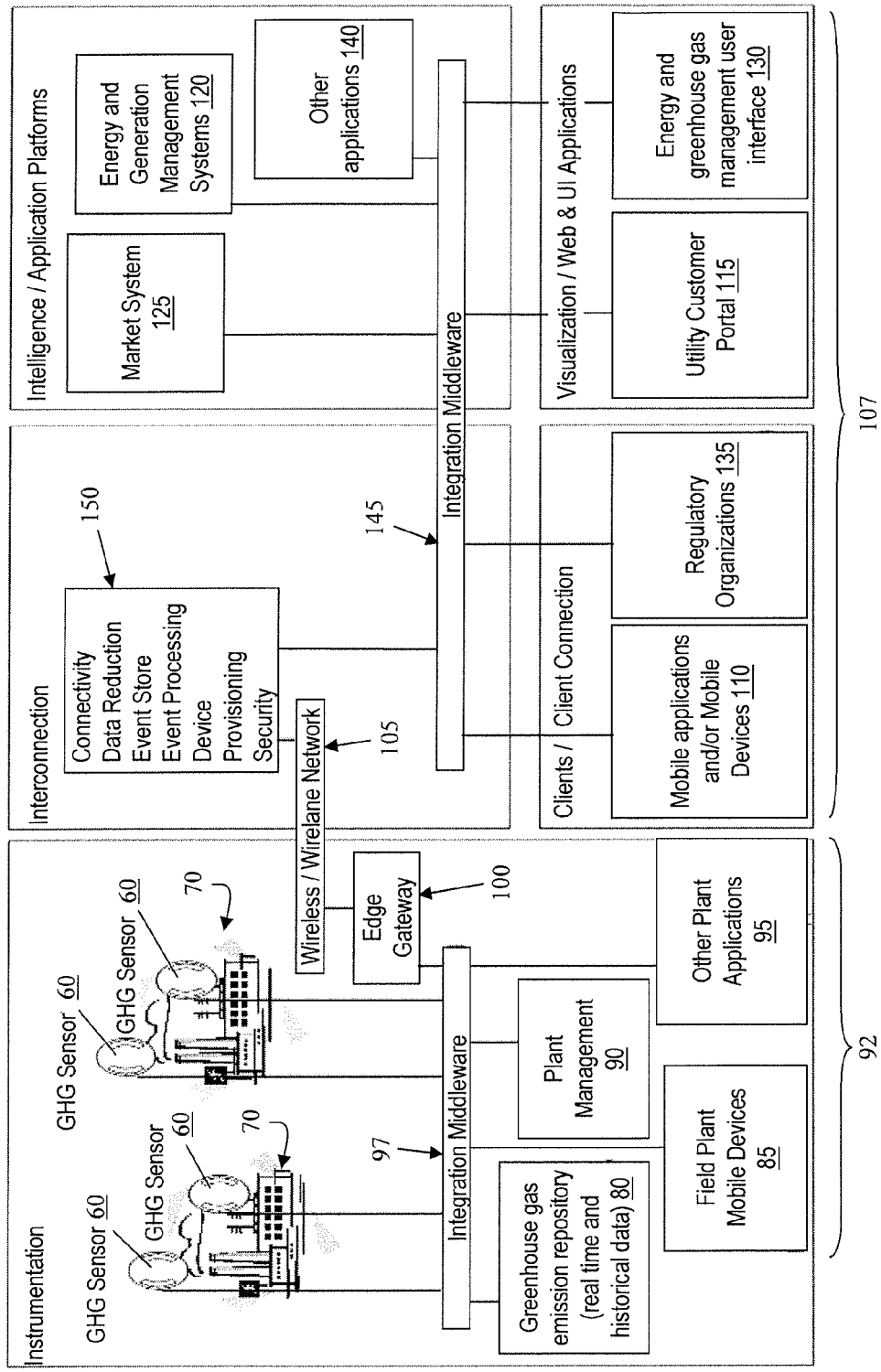
FIG. 2 shows an illustrative Service Oriented Architecture (SOA) environment for implementing steps in accordance with aspects of the invention.

FIG. 2 shows an illustrative Service Oriented Architecture (SOA) environment for implementing steps in accordance with aspects of the invention. In SOA embodiments, the sensors 60 at the measurement point (e.g., facilities 70) measure the greenhouse gas emissions levels (e.g., obtain greenhouse gas emissions real-time measurements), process the sensed greenhouse gas emissions level, and convert it to text-based or XML-based message. The generated message is then published by the local web service at the generating facility 70 and made available to subscriber applications.

The published messages may be stored in a repository 80 (e.g., such as storage system 22B) for historical analysis purposes. The published messages may also be used (e.g., leveraged) within the generating facility 70 by internal subscribers 92 such as field plant mobile devices 85, plant management systems 90, and any other plant applications 95, e.g., to adjust the greenhouse gas emission level, e.g., by modifying at least one of the consumed fuel/fossil combustible and the configuration of the generation facility 70 to increase production by low-emission units and decrease production by high emission units. Subscribers 92 that are internal to the generating facility 70, such as field plant mobile devices 85, plant management systems 90, and other plant applications 95, obtain real-time measurements of the greenhouse gas emissions by making a web service call to integration middleware 97 and receiving, in return, the published message(s). Each internal subscriber 92 may comprise a subscriber device 65 as described in FIG. 1.

The published messages containing the greenhouse gas emissions real-time measurements can also be made available to third party applications and systems via a computing device 100 that publishes the messages in a secure manner to an external network 105, such as a wireless/wirelane network, e.g., the Internet, etc. The computing device 100 may include or be included in computing device 14 described with respect to FIG. 1, and may comprise an edge gateway or other device that provides a secure communication link between the integration middleware 97 and the external network 105.

Still referring to FIG. 2, external subscribers 107, e.g., subscribers that are external to the facility 70, are represented by reference numbers 110, 115, 120, 125, 130, 135, and 140. The external subscribers 107 obtain the greenhouse gas emissions real-time measurements by making a web service call to integration middleware 145 and receiving, in return, the published message(s). Each external subscriber 107 may comprise a subscriber device 65 as described in FIG. 1. Publishing of the messages to the external subscribers 107 is facilitated by and the integration middleware 145 and interconnection node(s) 150 providing standard web service interface capabilities between the network 105 and the integration middleware 145, as are understood by those of skill in the art such that further explanation is not believed necessary.

In embodiments, the external subscribers 107 include mobile clients, such as, but not limited to, mobile applications/devices 110 of electricity customers, and a utility customer portal 115 (e.g., in which the utility customer uses a web portal to call the web service to obtain the published messages containing the greenhouse gas emissions real-time measurements). These external subscribers 107 may subscribe the messages and present the greenhouse gas emission level in real-time, along with locally stored historical information for potential trending, extrapolation, and more detailed analysis.

In additional embodiments, the external subscribers 107 include other devices and/or applications, such as energy and generation management systems 120, market systems 125 (e.g., used by utilities during buying and selling of electricity), energy and greenhouse gas management user interfaces 130 (e.g., a user interface presented to an operator at a control center), regulatory organization systems 135, and other applications 140. The greenhouse gas real-time emission level published messages are routed within a secure environment via secure communication protocol or through an enterprise bus service, which serves as a gateway between the publisher and subscriber applications.

Advantages of using a Service Oriented Architecture with implementations of the invention include: the SOA-based system architecture provides immense interoperability capabilities for external systems (e.g., external subscribers 107) to subscribe and leverage greenhouse gas emission levels; the SOA-based system architecture extends and provides flexibility to extend existing system analytics and infrastructure process greenhouse gas data on real-time basis; the SOA-based system architecture follows open standard such that applications can be integrated, developed and maintained effectively and efficiently; skills required to deploy an SOA implementation are available and requires low learning curve; and the SOA-based system architecture leverages proven Internet security mechanisms.

SIP Environment

Figure 3:
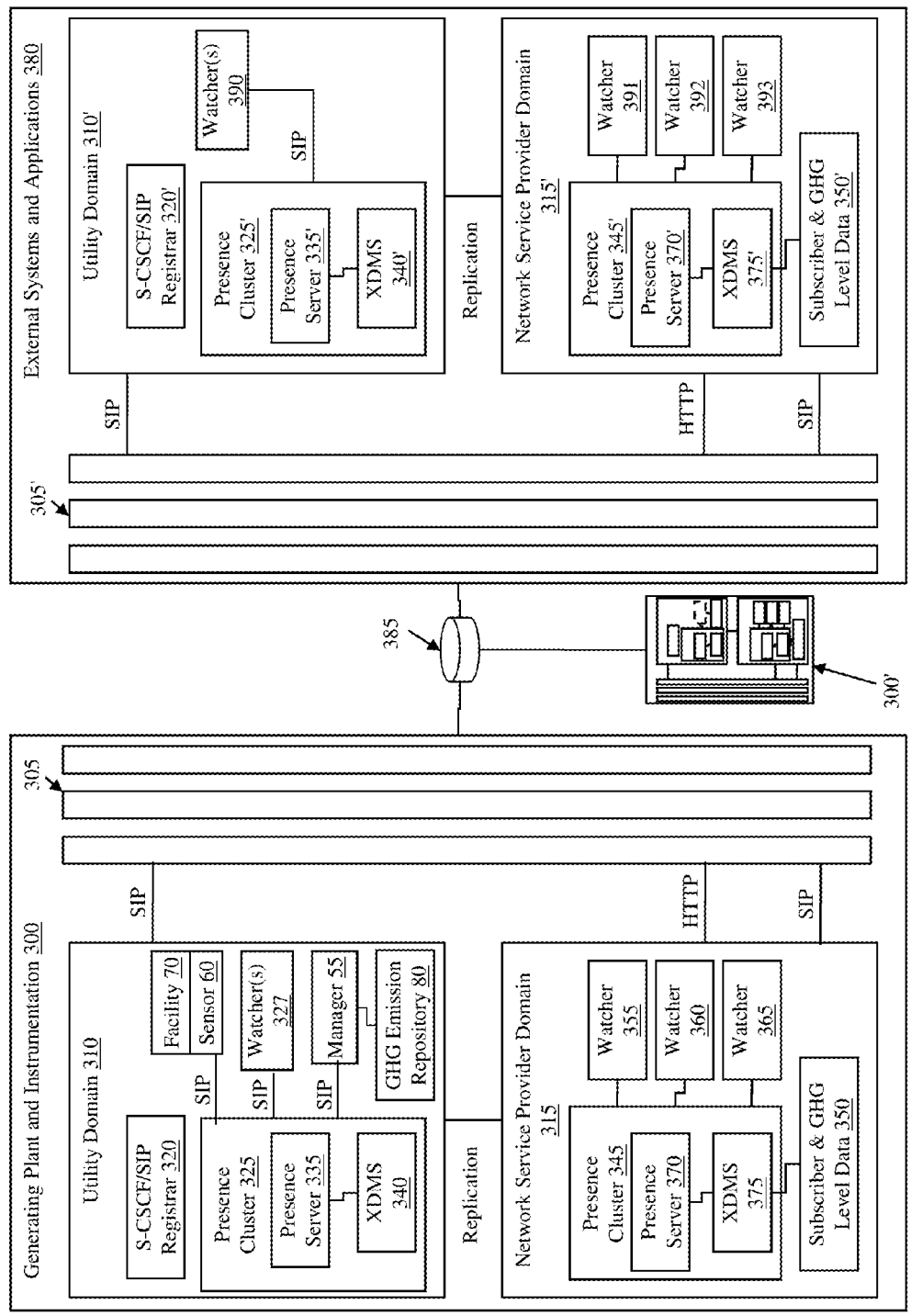
FIG. 3 shows an illustrative Session Initial Protocol (SIP) environment for implementing steps in accordance with aspects of the invention.

FIG. 3 shows an illustrative Session Initial Protocol (SIP) environment for implementing steps in accordance with aspects of the invention. In SIP embodiments, the sensors 60 at the measurement point (e.g., facilities 70) measure the greenhouse gas emissions levels (e.g., obtain greenhouse gas emissions real-time measurements), process the sensed greenhouse gas emissions level, and send data defining the sensed greenhouse gas emissions level to one or more presence servers. Subscriber devices obtain the greenhouse gas emissions level from the presence servers via SIP notifications on a SIP subscription basis.

In SIP based implementations of the invention, a lightweight SIP client is attached to the frequency radio that is embedded within the greenhouse gas sensor 60. Additionally, the server side is provisioned so that over and above the Mobile Subscriber Integrated Services Digital Network Number (MSISDN) the subscriber device is also registered as an IMS (IP Multimedia Subsystem)/SIP client to a server side presence server. In embodiments, a sensor 60 sends greenhouse gas emission level measurement data to a presence server when the sensor 60 detects a change in the greenhouse gas emission. The presence server may be located in any suitable location, including but not limited to the generating facility 70 or in premises of subscriber applications, e.g., distribution, transmission, generation control centers, etc. Alterations to the presence document are recorded so that, associated with a subscriber/radio, there is a structure that fully describes the greenhouse gas emission level with a particular generating facility 70. Short term historical data can also be provided via extension to the SIP message structure.

In particular, FIG. 3 shows an exemplary SIP-based architecture for implementations of the invention. In embodiments, a generating plant and instrumentation block 300 includes a load balancing layer 305, a utility domain 310, and a network service provider domain 315. The utility domain 310 is a network domain of a power generation facility 70 equipped with at least one sensor 60 as described herein. In embodiments, the utility domain 310 includes a Serving Call Session Control Function (S-CSCF)/SIP registrar 320, a presence cluster 325, the manager 55, and a greenhouse gas emission repository 80 that stores real time and historical greenhouse gas emission data obtained by the sensor 60.

In embodiments, the S-CSCF/SIP registrar 320 is a SIP server that controls SIP sessions between components (e.g., sensors and subscribers) and the domains 310, 315. In particular, the S-CSCF/SIP registrar 320 handles SIP registrations of the sensor 60 and the one or more watchers 327. So, over and above a Mobile Subscriber Integrated Services Digital Network Number (MSISDN) of these entities, they are registered as IP Multimedia Subsystem (IMS)/SIP clients in the domains 310, 315. In embodiments, the S-CSCF/SIP registrar 320 may be implemented in the server 12 and/or the computing device 14 in FIG. 1, and may be alternatively located in the network service provider domain 315 and/or a third-party location. After registration, the S-CSCF/SIP registrar 320 forwards SIP messages from the sensors 60 and one or more watchers 327 to components in the domains 310, 315, such as the presence cluster 325. The one or more watchers 327 may each comprise a respective subscriber device, such as subscriber device 65 described with respect to FIG. 1. Moreover, the one or more watchers 327 may comprise internal subscribers, similar to internal subscribers 92 including field plant mobile devices 85, plant management systems 90, and other plant applications 95, as described with respect to FIG. 2.

The presence cluster 325 includes a presence server 335 and an Extensible Markup Language (XML) Data Management Server (XDMS) 340. The presence server 335 is a SIP application server that communicates and stores presence information of client devices, such as the sensor 60 and the watcher(s) 327. The presence server 335 can be implemented in the server 12 of FIG. 1 and, for example, in the manager 55. Specifically, the presence server 335 receives SIP notify messages including the presence information from the client devices. The presence information may include, for example, sensed greenhouse gas emissions data from a sensor 60.

With this received presence information, the presence server 335 sends the presence information to the XDMS 340 that builds or updates a presence document including the presence information. In embodiments, this presence document can include the presence information of all sensors 60 and watcher(s) 327 within a specified area. The presence document may include multiple nodes, or in other words, the presence document may refer to multiple areas in the electrical grid and their associated client devices. In embodiments, the presence document and the SIP messages can be in a XML format, a Rich Presence Information Data (RPID) format, and/or a Presence Information Data Format (PDIF). The XDMS 340 may be implemented in the server 12 of FIG. 1.

Additionally, the presence server 335 receives SIP subscribe messages from the client devices, for example, the watcher(s) 327 and the manager 55. The SIP subscribe messages are requests to receive (e.g., to subscribe to) updates about the presence information from the presence server 335. The presence server 335 manages these SIP subscribe messages from the client devices and when there is an update about the presence information, the presence server 335 automatically sends SIP publish messages (with the presence information) quickly and effectively to the subscribing client devices (e.g., the watcher(s) 327 and the manager 55). The presence server 335 may send information regarding the subscribing client devices ("subscriber presence information") to the XDMS 340, which may then update the corresponding presence document to include such subscriber presence information. As a result, the presence document may include information regarding relationships between sensors 60 and subscribing watcher(s) 327 interested in receiving updated presence information with respect to these sensors 60.

The presence information and other pertinent information can be provided to the manager 55 via SIP messaging. By quickly updating the manager 55 with the presence information of the sensor 60 via a SIP channel, the manager 55 can rapidly react to any notification in a temporally and channel-appropriate manner. Advantageously, the use of SIP messaging is massively scalable and results in low latency communications between the sensor 60, the watcher(s) 327, the presence server 335, and/or the manager 55.

The network service provider domain 315 is a network domain of an Internet service provider and/or a cellular service provider. In embodiments, the network service provider domain 315 can include a presence cluster 345, a subscriber and greenhouse gas level database 350, and watchers 355, 360, and 365. The presence cluster 345 includes a presence server 370 and a XDMS 375, which perform functions similar to those of the presence server 335 and the XDMS 340 in the utility domain 310. In fact, all information (e.g., the presence information and the subscriber presence information) received and processed in the presence server 335 and the XDMS 340 in the utility domain 310 may be transferred to, or replicated in, the presence server 370 and the XDMS 375 in the network service provider domain 315, and vice versa. In embodiments, replication in the domains 310, 315 can be accomplished via peering and dedicated bandwidth between the domains 310, 315. In embodiments, the presence servers 335, 370 may be in a hierarchal relationship, for example, where the presence server 335 is a primary, master server and the presence server 370 is a secondary, slave server.

The subscriber and greenhouse gas level database 350 receives the built or replicated presence documents from the XDMS 375 and stores the presence documents for the system. The watchers 355, 360, 365 are entities in the network service provider domain 315 that send SIP subscribe messages to the presence cluster 345 to subscribe to updates regarding the presence information in the presence server 370, e.g., the SIP publish messages. For example, one or more of the watchers 355, 360, 365 can represent a subscriber device 65 described with respect to FIG. 1 and/or correspond to an internal subscriber 92 as described with respect to FIG. 2.

By subscribing to the SIP publish messages, the watchers 355, 360, 365 are able to watch for notifications of status information of the sensor 60. In addition, the watchers 355, 360, 365 are able to react to these notifications as necessary. In embodiments, presence infrastructure (e.g., the presence cluster 345) can be present in the network service provider domain 315, and a watcher (e.g., the manager 55) can be present in the utility domain 310. In other words, the manager 55 may correspond to a watcher. In this embodiment, the manager 55 can subscribe to all presence information updates or events and react as necessary. To transfer information, the domains 310, 315 may include dedicated bandwidth between the two sides. In embodiments, the presence infrastructure can include multiple presence clusters for different types of devices, such as subscriber devices, sensors, and watchers.

External systems and applications 380 communicate with the domains 310, 315 via a communication network 385, which may comprise a telecommunication communication network utilizing SIP, HTTPS, SSL, etc. The external systems and applications 380 may include one or more external watchers 390-393, which may include, for example, a subscriber device 65 described with respect to FIG. 1 and/or correspond to one or more of the external subscribers 107 described in FIG. 2, such as mobile applications/devices 110 of electricity customers, a utility customer portal 115, energy and generation management systems 120, market systems 125, energy and greenhouse gas management user interfaces 130, regulatory organization systems 135, and other applications 140.

The external systems and applications 380 may include a load balancing layer 305', utility domain 310', network service provider domain 315', S-CSCF/SIP registrar 320', presence cluster 325', presence server 335', XDMS 340'. The network service provider domain 315' includes presence cluster 345', presence server 370', XDMS 375', and subscriber and greenhouse gas level data 350'. All of these are similar to those elements of the generating plant and instrumentation 300. In embodiments, the load balancing layers 305, 305' may distribute data (e.g., a load) evenly between the above entities. For example, the load balancing layers 305, 305' may be provided in a network switch and a gateway router, which may be implemented in the computing device 14 of FIG. 1. The load balancing layers 305, 305' include a SIP client and a web client such that the load balancing layers 305, 305' is able to communicate in SIP and HTTP with other SIP-enabled and/or HTTP-enabled entities.

In FIG. 3, the generating plant and instrumentation block 300 refers to a single facility 70. However, any number of additional facilities 70 may provide sensed greenhouse gas emission information to the system, as represented by additional instance 300'. In this manner, external watchers 390-393 may receive greenhouse gas emission data from more than one facility 70.

In the SIP implementation depicted in FIG. 3, there are several copies of presence servers. The primary and master presence server 335 is located within the generation plant block 300. The greenhouse gas sensor 60 registers to the master presence server 335 and publishes periodically, or on demand, the measured greenhouse gas emission level. The applications (e.g., watchers 327) within the generation plant, including, but not limited to, plant controller, historical data report analysis application, subscribes to the greenhouse gas emission level information by becoming watcher of the master presence server 335. The additional presence server 370 in the network service provider domain 315, within the generation plant block 300, replicates the primary presence server data, via peering, as necessary. Multiple authorized watchers 327, 355, 360, 365 can be deployed as appropriate to watch for greenhouse gas emission level measurements notifications. The dual presence servers 335, 370 located at the generation plant interact with other presence servers, e.g., 335' and 370', via SIP messages. In these presence servers 335' and 370' advanced intelligence subsystems and applications (e.g., watchers 390-393) can subscribe to greenhouse gas emission level SIP notifications and act accordingly, e.g., adjust as need be the behavior of sensed generating units.

Advantages of using a SIP methodology with implementations of the invention include: a SIP architecture provides easy, cost effective scalability of a solution; a SIP architecture provides immense flexibility of monitoring different parameters, as it is XCAP configuration driven; a SIP architecture extends and provides flexibility to consolidate various purposed built sensing infrastructure to common platform and let the data be processed on need basis by different processing system; a SIP architecture follows open standard thus applications can be integrated, developed and maintained much more effectively; skills required to deploy this architecture is easily available and it requires low learning curve; and a SIP architecture leverages proven internet security mechanisms.

Processes

FIGS. 4-9 show exemplary flows for performing exemplary processes in accordance with aspects of the invention. The steps of FIG. 4-9 may be implemented in the environments of FIGS. 1-3, for example. The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-3. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 4:
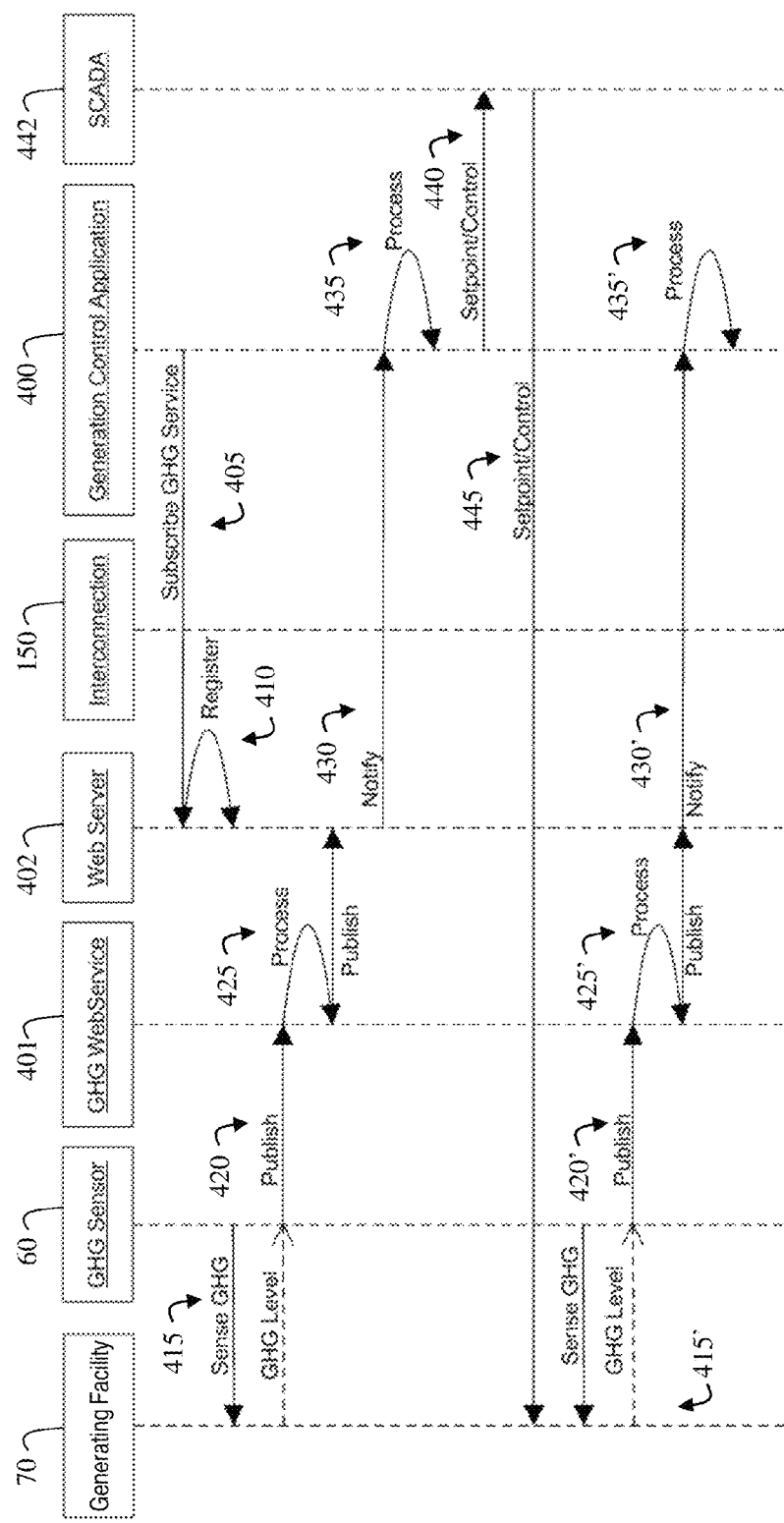

FIG. 4 is a sequence diagram describing an exemplary use case in an SOA implementation of the invention where a real-time automatic generation control application 400 makes use of the sensed greenhouse gas emission levels to adjust setpoints and control signals sent to the generating units (e.g., facilities 70) to favor a more environmental friendly generating unit. At step 405, an application 400 subscribes to the greenhouse gas web service 401 by sending an appropriate message to the web server 402. The web server 402 can be implemented in the server 12 of FIG. 1 and, for example, in the manager 55. At step 410, the web server 402 registers the application with the greenhouse gas web service 401. The application 400 may comprise any subscriber, such as subscribers 92, 107 from FIG. 2. The greenhouse gas web service 401 and web server 402, including the manager 55, may be comprised in the integration middleware 97 described with respect to FIG. 2. Communication between the application 400 and the web server 402 may be facilitated through an interconnection 150, similar to that described with respect to FIG. 2.

At step 415, the sensor 60 senses the greenhouse gas emission level at a generating facility 70. At step 420, the sensor 60 publishes the sensed greenhouse gas emission level, from step 415, to the greenhouse gas web service 401. At step 425, the greenhouse gas web service processes and publishes the sensed greenhouse gas emission level to the web server 402. At step 430, the web server 402 notifies subscribers, such as the application 400, of the processed greenhouse gas emission level. In this manner, the application 400 is provided with the greenhouse gas emission level data, detected by sensor 60 at step 415, via an SOA based communication system.

Upon receiving the greenhouse gas emission level data, the application 400 may process the data at step 435 in any desired manner. For example, the processing at step 435 may comprise the application 400 comparing the greenhouse gas emission level data to a predetermined maximum, and determining the current greenhouse gas emission level exceeds the maximum. Based on the determination that the current greenhouse gas emission level exceeds the predetermined maximum, at step 440, the application 401 may transmit a setpoint and/or control condition to the SCADA 442. And, at step 445, the SCADA 442 may transmit a setpoint and/or control signal to the generating facility 70 that causes the generating facility 70 to change its operation, e.g., lower the greenhouse gas emission level by lowering the amount of electricity being produced at the generating facility 70.

The process may periodically repeat itself, as depicted by steps 415', 420', 425', 430', and 435' in FIG. 4. The process may repeat itself at predetermined intervals, e.g., the sensor 60 senses and publishes the greenhouse gas emission level once per minute, or any other desired interval. Additionally or alternatively, the process may be initiated by occurrence of a defined event, e.g., the sensor 60 publishes a new greenhouse gas emission level when a current sensed greenhouse gas emission level differs from a previous level by a predetermined amount.

Although the processing step 435 is described with respect to comparing the current sensed greenhouse gas emission level to a predetermined maximum, the invention is not limited to this type of processing. Instead, any desired processing for any desired application may be used within the scope of the invention. Additional non-limiting, exemplary types of processing are illustrated with reference to use cases described with respect to FIGS. 6-9 in greater detail below. For example, the processes described in FIGS. 6-9 may be carried out using SOA based communication in a manner similar to that described in FIG. 4, e.g., including the web server receiving a subscription from a subscriber device and/or application, the web server receiving data defining the detected greenhouse gas emission level from the sensor and/ or web service, and the web server communicating the data defining the detected gas emission level to the subscriber device using SOA based communication.

Figure 5:
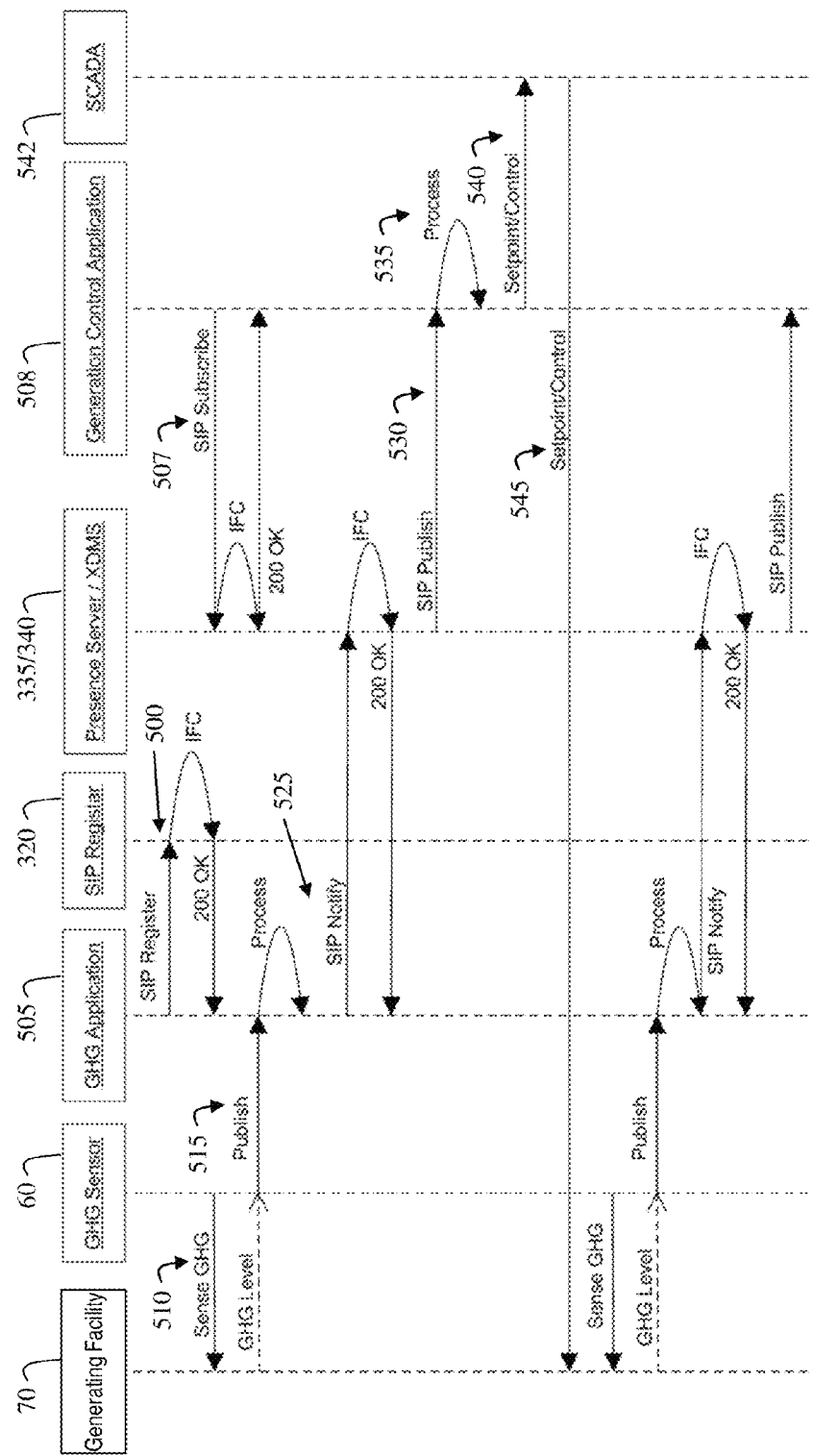

FIG. 5 is a sequence diagram describing an exemplary use case in a SIP implementation of the invention. The use case depicted in FIG. 5 is similar to that shown in FIG. 4, e.g., a real-time automatic generation control application 400 makes use of the sensed greenhouse gas emission level to adjust the setpoints and control signals sent to the generating units to favor a more environmental friendly generating unit. At step 500, a greenhouse gas application 505 performs a SIP register with the SIP registrar, such as SIP registrar 320 described above with respect to FIG. 3. The greenhouse gas application 505 may be software embedded in the sensor 60 and/or the manager 55 described in FIGS. 1 and 2. At step 507, the generation control application 508 transmits a SIP subscribe message to the presence server and/or XDMS, such as the presence server 335 and XDMS 340 described in FIG. 3. The generation control application 508 may comprise any suitable subscriber device, such as any of watchers 327, 355, 360, 365, and 390-393 described in FIG. 3.

At step 510, the sensor 60 senses (e.g., detects) the current greenhouse gas emission level at a generating facility 70. At step 515, the sensor 60 publishes the sensed greenhouse gas emission level, from step 510, to the greenhouse gas application 505. At step 525, the greenhouse gas application 505 processes the data defining the sensed greenhouse gas emission level and transmits a SIP notification to the presence server and/or XDMS. At step 530, the presence server and/or XDMS publishes the current greenhouse gas emission level to subscribers, such as the application 400. In this manner, the application 400 is provided with the greenhouse gas emission level data, detected by sensor 60 at step 510, via an SIP based communication system.

Upon receiving the greenhouse gas emission level data, the application 508 may process the data at step 535 in any desired manner, such as that described with respect to FIG. 4. For example, the processing at step 535 may comprise comparing the greenhouse gas emission level data to one or more predetermined values, and at step 540 communicating a setpoint and/or control signal to another application, such as a SCADA 542, based on the comparing. At step 545, the SCADA 542 then transmits a setpoint and/or control signal to the generating facility 70 to change the operation of the generating plant, e.g., generate more or less electricity based on the greenhouse gas emission level from step 510.

The process described thus far with respect to FIG. 5 may repeat itself at predetermined time intervals. Additionally or alternatively, the process may be initiated by occurrence of a defined event, e.g., the sensor 60 publishes a new greenhouse gas emission level when a current sensed greenhouse gas emission level differs from a previous level by a predetermined amount.

Although the processing step 535 is described with respect to comparing the current sensed greenhouse gas emission level to a predetermined maximum, the invention is not limited to this type of processing. Instead, any desired processing for any desired application may be used within the scope of the invention. Additional non-limiting, exemplary types of processing are illustrated with reference to use cases described with respect to FIGS. 6-9 in greater detail below. For example, the processes described in FIGS. 6-9 may be carried out using SIP based communication in a manner similar to that described in FIG. 5, e.g., including the presence server and/or XDMS receiving a subscription from a subscriber device and/or application, the presence server and/or XDMS receiving data defining the detected greenhouse gas emission level from the sensor and/or an application, and the presence server and/or XDMS communicating the data defining the detected gas emission level to the subscriber device using SIP based communication.

FIG. 6 depicts a process of an exemplary use case in accordance with aspects of the invention in which actual greenhouse gas emissions levels are compared to previously predicted greenhouse gas emissions levels. At step 610, the plant management (e.g., plant management 90) or other end user forecasts greenhouse gas emissions of a facility 70 for a future time period. For example, the forecast may be a prediction of hourly greenhouse gas emissions for the following day, similar to existing forecasted hourly electricity production. At step 620, the greenhouse gas emission levels are detected during the future time period that was defined in step 610, e.g., the following day. The detecting at step 620 may correspond to steps 415 and 510 from FIGS. 4 and 5.

At step 630, at least the actual greenhouse gas emissions levels data from step 620 is communicated to an application, such as subscribers 92 and/or 107, in a manner similar to that described in FIGS. 2 and 4 (e.g., using SOA based communication) or FIGS. 3 and 5 (e.g., using SIP based communication).

At step 640, the detected greenhouse gas emission levels from step 620 are compared to the predicted value(s) from step 610. For example, the comparison at step 640 may comprise determining whether the detected greenhouse gas emission levels from step 620 are within a predetermined acceptable margin of error of the values predicted at step 610. The processing at step 630 may correspond to steps 435 and 535 from FIGS. 4 and 5.

At step 650, action is taken based on the results of the comparison from step 630. The action at step 650 may comprise, for example, generating and transmitting a control signal to the plant to cause the greenhouse gas emission level to match the predicted value. Additionally or alternatively, the action at step 650 may comprise imposing a market-based penalty on the facility 70 based on the difference between the detected greenhouse gas emission levels from step 620 and the predicted value(s) from step 610.

The steps of FIG. 6 may be used, for example, in wholesale market operations in which a marketing clearing engine of market operations takes into consideration the provided forecasts, e.g., from step 610, to commit the units, e.g., facilities 70, for the next day. Then, during the real-time market operations, the market operators and monitoring applications (e.g., market systems 125, regulatory organizations 135, etc.) may ensure the greenhouse gas real-time emissions of committed units are not higher than forecasted and take corrective action, e.g., submit the generation units to penalties, when the actual greenhouse gas emissions are higher than the forecasted levels, similar to the penalties imposed when the actual generated amount of electricity is lower than the committed forecast.

FIG. 7 depicts a process of an exemplary use case in accordance with aspects of the invention. At step 710, a plurality of sensors 60 are used to detect the respective greenhouse gas emissions levels of a plurality of power generating facilities 70. At step 715, the respective power output of each of the plurality of power generating facilities 70 is determined, e.g., using conventional plant monitoring applications.

At step 717, the respective greenhouse gas emissions levels and the respective power output are communicated to an application, such as subscribers 92, 107, etc. At least the respective greenhouse gas emissions levels data may be communicated to the application in a manner similar to that described in FIGS. 2 and 4 (e.g., using SOA based communication) or FIGS. 3 and 5 (e.g., using SIP based communication).

At step 720, the application determines an optimum level of power generation for each of the plurality of facilities 70 based on a combination of: the respective greenhouse gas emissions level for each of the plurality of facilities 70, the respective power output of each of the facilities 70, and/or the total target power output for the plurality of plants as whole. At step 730, the application transmits control signals to at least one of the plurality of facilities based on the determination at step 720.

For example, the determination at step 720 may comprise the application determining a ratio of power unit per greenhouse gas unit for each respective facility 70, and an adjustment to the power generation of one or more of the plurality of facilities 70 to simultaneously achieve a reduction in greenhouse gas emissions while maintaining a total power output for the plurality of facilities. Even more specifically, the application may determine a first facility has a relative high power to greenhouse gas output and a second facility has a relative low power to greenhouse gas output. In such a case, the application may send appropriate control signals to the first and second facilities to increase the power production at the first facility and decrease the power production at the second facility, while ensuring that the total power production of the first and second facilities combined equals a threshold amount.

In another example of optimizing the output of each of the plurality of plants at step 720, the application may compare the greenhouse gas output of the first facility to a first threshold and a greenhouse gas output of the second facility to a second threshold. The thresholds may represent, for example, maximum allowable greenhouse gas output for the particular plant. When the greenhouse gas output of the first facility exceeds the first threshold and the greenhouse gas output of the second facility is below the second threshold, the application may generate appropriate control signals to cause the first facility to reduce power generation and the second facility to increase power generation. In this case, the respective signals to the first and second facilities are tailored to: cause the first facility to reduce its power generation such that the greenhouse gas emissions of the first facility decrease to the first threshold or lower; cause the second facility to increase its power generation without causing the greenhouse gas output of the second facility to exceed the second threshold; and cause the collective power output of the first and second facilities to meet or exceed a predetermined amount.

The application described in FIG. 7 may comprise any suitable application, such as for example, plant management 90, generation management system 120, etc. The control signals may be transmitted, for example, via a SCADA, etc. The application may determine optimum operating levels for each of the respective plants using any suitable numerical optimization techniques, such as, for example, sum of least squares, etc.

In this manner, the process of FIG. 7 may be used to provide automated control and real-time dispatching of a plurality of power generating facilities to ensure energy demand is met while minimizing greenhouse gas emissions amongst the plurality of facilities. For example, the generation control applications receive data from the generating facilities, via the SCADA subsystem or directly from the generating facility, where the data includes the real-time power output of generating facilities, including generated megawatts (MW), frequency as well as greenhouse gas emission levels. When the control area under the generation management system (GMS) has sufficient reserve and the transmission network is not congested, the generation control applications can increase power generation at one or more generating facilities emitting the lesser amount of greenhouse gas emissions, e.g., by sending raised set-points to these units, while instructing the generating facilities emitting more greenhouse gas to lower its energy generation.

FIG. 8 depicts a process of an exemplary use case in accordance with aspects of the invention in which current and predicted greenhouse gas emissions are presented to a user in conjunction with current and predicted weather. In this manner, the user may optimize power generation and/or alert consumers to upcoming conditions based on a combination of greenhouse gas emissions and weather data. More specifically, at step 810, at least one sensor 60 is used to detect the current greenhouse gas emissions level of at least one power generating facilities 70. At step 820, the predicted greenhouse gas emissions level of the at least the one power generating facility is determined, e.g., by using a combination of predicted power generation for the upcoming time period and historic greenhouse gas emission level data. At step 830, current weather data and predicted weather data are obtained using conventional techniques. In embodiments, the weather data is for a geographic region where the at least one power generating facilities 70 are located and/or where the consumers associated with the at least one power generating facilities 70 are located. Additionally, the predicted weather data is for a time period corresponding to the predicted greenhouse gas emissions level, e.g., substantially the same time period, e.g., the next day.

At step 835, the current and predicted greenhouse gas emissions level data and the current and predicted weather data are communicated to the user, which may comprise any of subscribers 92 and 107. At least the current greenhouse gas emission level data may be communicated to the user in a manner similar to that described in FIGS. 2 and 4 (e.g., using SOA based communication) or FIGS. 3 and 5 (e.g., using SIP based communication).

At step 840, the current and predicted greenhouse gas emissions level data and the current and predicted weather data is presented to a user. In embodiments, all of the data of step 840 is presented in a single display, such as a graphical user interface included in an energy and greenhouse gas management user interface 130 described in FIG. 2. In many control centers, the operators are provided with the current and short term weather forecast, including temperature, rain and lightning information in order to increase their situational awareness of external conditions which could impact the generation, transmission and distribution of electricity. In embodiments, the operators are provided with both current and forecasted weather and greenhouse gas emissions data to assist the operators in manually optimizing power generation for lowering the overall amount of emitted greenhouse gases. In implementations, both weather data (e.g., coming from external services, such as, but not limited to, weather data web services) and greenhouse gas emissions data are shown to the operators through the use of advanced visualization tools, providing geospatial displays, leveraging configurable color scales to easily detect area of concerns and generating units emitting higher levels of greenhouse gas.

FIG. 9 depicts a process of an exemplary use case in accordance with aspects of the invention in which greenhouse gas emissions data are presented to an end user. The end user may be any of subscribers 92 and 107, such as an electricity customer (e.g., mobile application 110 described in FIG. 2), a regulatory/oversight entity (e.g., regulatory organization 135 described in FIG. 2), etc. More specifically, at step 910, at least one sensor 60 detects the current greenhouse gas emissions level of at least one power generating facilities 70. At step 920, the greenhouse gas emission level data is communicated to the end user. In embodiments, the current greenhouse gas emission level data may be communicated to the customer in a manner similar to that described in FIGS. 2 and 4 (e.g., using SOA based communication) or FIGS. 3 and 5 (e.g., using SIP based communication).

In accordance with aspects of the invention, the end user described in FIG. 9 may be a customer that uses electricity provided by the at least one power generating facilities 70. The customer may comprise a mobile application/device 110, e.g., as described in FIG. 2, for receiving real time greenhouse gas emission level data. In this manner, the customer may adjust their usage based on the received greenhouse gas emissions level data. In embodiments, the greenhouse gas emission level data is for power generating facilities 70 in a geographic region associated with the customer, e.g., the same state. In this manner, the process of FIG. 9 may be used to empower the customer to better manage their energy usage and increase their awareness of the electrical grid current conditions, via the utility web portal or mobile applications. The portal or mobile applications provide the customers with information related to their real-time energy usage, as well as outages information. In addition, the portal and mobile applications provided by the utility provide the customers with the current greenhouse gas emissions of generating facilities of particular area, when the portal or mobile application subscribes or obtains the real-time greenhouse gas emissions from the generating facilities.

In accordance with further aspects of the invention, the end user described in FIG. 9 may be a regulatory or oversight entity that monitors the amount of greenhouse gas emissions from any number of respective facilities 70 for purposes such as, for example, compliance with environmental regulations, determination of applicable surcharges and/or fees, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Many modifications and variations will be apparent to those of ordinary skill in the art without departing from the scope and spirit of the invention. The corresponding structures, materials, acts, and equivalents of all means or step plus function elements in the claims, if applicable, are intended to include any structure, material, or act for performing the function in combination with other claimed elements as specifically claimed. Accordingly, while the invention has been described in terms of embodiments, those of skill in the art will recognize that the invention can be practiced with modifications and in the spirit and scope of the appended claims.

What is claimed is:

1. A method implemented in a computer infrastructure, comprising:
   receiving data defining a detected gas emission level of a power generation facility;
   communicating the data defining the detected gas emission level to at least one subscriber device using one of Service Oriented Architecture (SOA) based communication and Session Initial Protocol (SIP) based communication;
   comparing a predicted gas emission level to the detected gas emission level to determine whether the detected gas emission level is within a predetermined margin of error of the predicted gas emission level, wherein the predicted gas emission level is a forecast of gas emissions of the power generation facility for a future time period; and
   transmitting a control signal to the power generation facility based on the determination that the detected gas emission level exceeds the predetermined margin of error,
   wherein the control signal changes power output of the power generation facility to cause an actual gas emission level of the power generation facility to match the predicted gas emission level.

2. The method of claim 1, wherein:
   the detected gas emission level comprises a greenhouse gas emission level; and
   the power generation facility comprises an electricity generating plant producing the greenhouse gas.

3. The method of claim 1, wherein:
   the one of SOA based communication and SIP based communication is SOA based communication;
   the at least one subscriber device is subscribed to a greenhouse gas web service via a web server;
   the detected gas emission level is provided by a sensor at the power generation facility which publishes the data to the web server; and
   the web server communicates the data by notifying the at least one subscriber device.

4. The method of claim 3, wherein the at least one subscriber device comprises at least one of:
   an internal subscriber that is internal relative to an edge gateway comprised in a communication network associated with the power generation facility; and
   an external subscriber that is external relative to the edge gateway.

5. The method of claim 1, wherein:
   the one of SOA based communication and SIP based communication is SIP based communication;
   the at least one subscriber device is subscribed to a presence server;
   the detected gas emission level is provided by a sensor at the power generation facility which publishes the data to a web server; and
   the presence server communicates the data by publishing the data to the at least one subscriber device.

6. The method of claim 5, wherein the at least one subscriber device comprises at least one of:
   an internal subscriber that is included in a domain comprised in a communication network associated with the power generation facility; and
   an external subscriber that is external relative to the domain.

7. The method of claim 1, further comprising:
receiving the control signal from the at least one subscriber based on the at least one subscriber device processing the data defining the detected gas emission level; and
adjusting an amount of power generation of the power generation facility based on the control signal.

8. The method of claim 1, wherein the detecting and the communicating are performed in real time.

9. The method of claim 8, wherein the detecting and the communicating are repeated at one of: a predefined time interval, and based on the detected gas emission level differing from a previous value by a predetermined amount.

10. The method of claim 1, further comprising:
predicting the predicted gas emission level at the power generation facility.

11. The method of claim 10, wherein:
the detected gas emission level exceeds the predicted gas emission level; and
the control signal causes the power generation facility to reduce the power output to reduce actual gas emissions.

12. The method of claim 1, further comprising:
determining the power output of the power generation facility;
detecting a second gas emission level at a second power generation facility;
determining a second power output of the second power generation facility; and
transmitting a first control signal to the power generation facility and a second control signal to the second power generation facility based on: the detected gas emission level, the detected second gas emission level, the power output, and the second power output.

13. The method of claim 1, further comprising:
predicting the predicted gas emission level at the power generation facility; and
obtaining current and predicted weather data;
wherein the communicating comprises transmitting the detected gas emission level, the predicted gas emission level, the current weather, and the predicted weather to the at least one subscriber device.

14. The method of claim 13, wherein the predicted gas emission level and the predicted weather data are for a same time period.

15. The method of claim 1, wherein a service provider at least one of creates, maintains, deploys and supports the computer infrastructure.

16. The method of claim 1, wherein steps of claim 1 are provided by a service provider on a subscription, advertising, and/or fee basis.

* * * * *